United States Patent Office 2,995,451
Patented Aug. 8, 1961

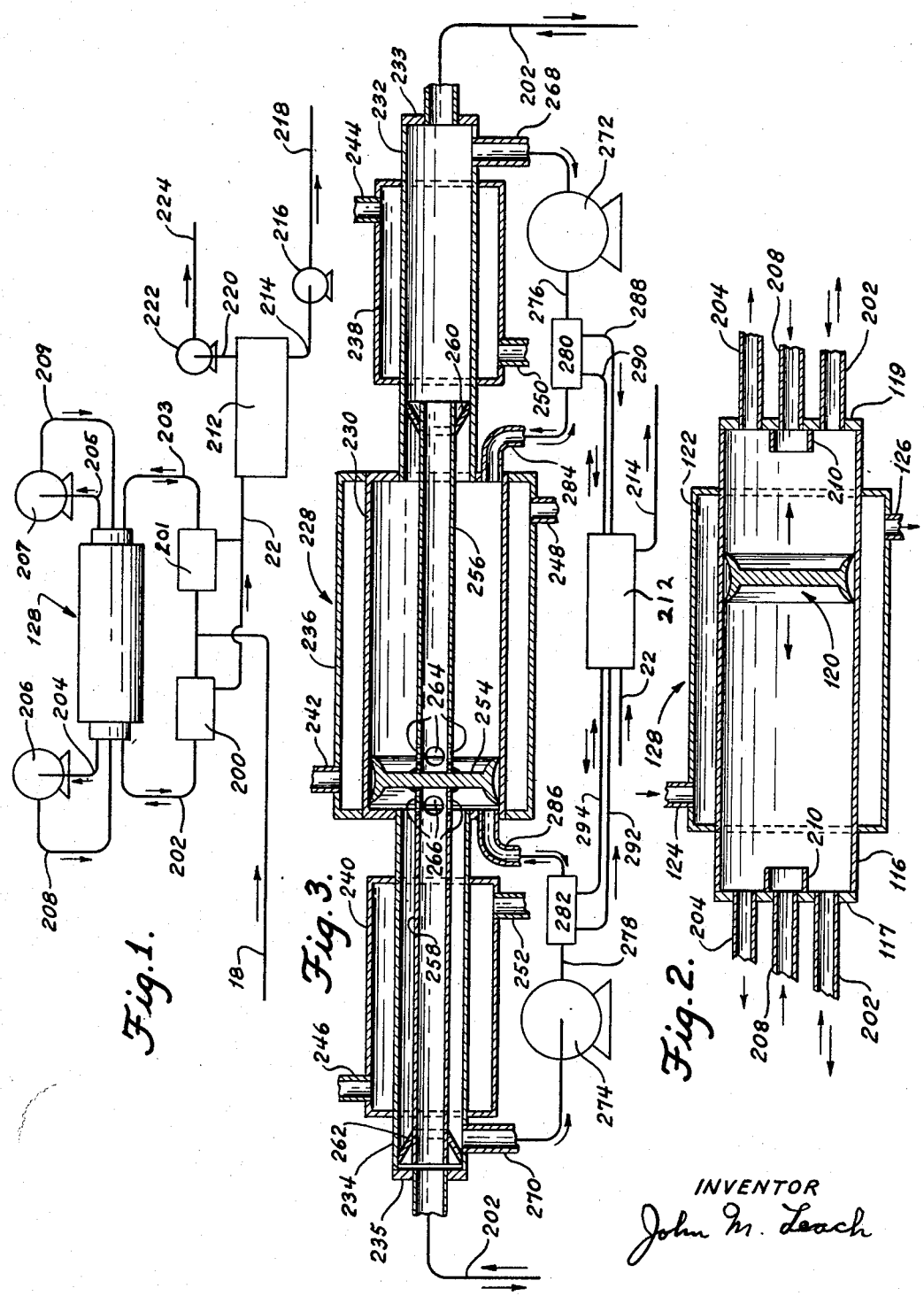

2,995,451
PROCESS AND APPARATUS FOR TREATING MATERIALS
John M. Leach, 17 Monfort Road, Port Washington, N.Y.
Filed Mar. 27, 1961, Ser. No. 98,347
20 Claims. (Cl. 99—134)

The present invention relates to continuous substance treating process and apparatus; and more particularly relates to process and apparatus whereby absolute control of the temperature and the actual heat imparted to or taken away from the substance being treated can be established exactly originally and accurately maintained uniformly throughout the full period of the treating operation.

In continuous treating apparatus and processes heretofore employed, the rate and the degree of the treatment have been dependent upon the rate of flow of the material through the treating apparatus. This has meant that any variation in the flow, however great or small, has resulted in an inevitable variation in the degree of treatment which has prevented the material from being uniformly treated because some flow variations can never be avoided in any system of the type formerly employed when such materials were subject to coagulation; gelation; degeneration; simple heating; simple cooling; reduction, or any other change in physical or chemical qualities due to temperature, pressure or other changes or combinations thereof.

It is an object of the present invention to provide a substance treating process and apparatus in which the rate of flow can be made absolutely constant; in which the amount of heat applied to or taken away from the material can be accurately controlled; in which a controlled pressure can be maintained with either a high or low rate of flow; and in which the rate of flow can be accurately controlled and scheduled even though pressure variations occur.

It is a further object of the present invention to provide an apparatus and process for treating materials in a closed vessel in which the material is positively removed from the walls of the vessel without the aid of externally mechanically connected apparatus.

It is another object of the present invention to provide a process and apparatus for treating materials in a closed vessel in which the material is constantly agitated and repeatedly passed over the treating surface of the closed vessel so as to give uniform application of the effect of the surface to the material.

It is a still further object of the present invention to provide a treating apparatus for material which is unusually simple in nature and which can be cleaned in a minimum time without the possibility of contaminating one batch of material by another.

Other objects of the presenti invention will become apparent to those skilled in the art as the description of the present invention in its now preferred form is disclosed.

Although the process and apparatus can be used to treat materials in many ways, such as heating, cooling, gelatinizing, polymerizing, hydrolyzing, acidifying, etc., for the purpose of explanation it will be described in connection with a heating operation, for example, starch base candy cooking.

The present application is a continuation-in-part of application Serial No. 652, filed January 5, 1960, covering a "Process and Apparatus for Modifying Material" and which was filed in the name of the present inventor.

For a more detailed description of the present invention, reference should be had to the following specification taken in connection with the accompanying drawings, throughout which like reference characters refer to like parts, and in which:

FIG. 1 is a diagrammatic view of one form of apparatus of the present invention;

FIG. 2 is a cross sectional view of a heating element of the present invention as exemplified by one modification thereof, and FIG. 3 is a cross sectional view of another modification of a heating element of the present invention.

The material to be treated is suitably pumped through a pipe 18 which delivers to two control valves 200 and 201 as shown in FIG. 1. The material may be suitably prepared and pumped as shown in FIG. 1 of application Ser. No. 652 and valves 200 and 201 may be the same as those shown in application Ser. No. 652 or these valves may be replaced by solenoid operated control valves generally available on the open market controlled by the timer 152. When a solenoid control valve such as those described above are used it is possible for the inlet pipes 202 and 203 to also serve as outlet pipes for the treating element 128 which somewhat simplifies the piping arrangement. In the system shown in FIG. 1 of this application, pipes 202 and 203 from the valves 200 and 201 communicate with opposite ends of a treating chamber 116 provided with removable heads 117 and 119 fastened to the chamber in any desired manner.

A suitable shuttle scraper member 120 is disposed within the chamber 116 for sliding and scraping movement in each direction depending upon which side is having the pressure applied to it.

A suitable heating or cooling jacket 122 is disposed around the treating chamber 116 and is supplied with heating or cooling media by an inlet pipe 124 and is exhausted by means of an outlet pipe 126.

In the arrangement shown in FIG. 1 and FIG. 2 material suitably mixed and under any desired pressure is supplied by pipe 18 to the valves 200 and 201. These valves are suitably controlled by the timer 152 shown by application Ser. No. 652 so that when the valve 200 is in position to pass material to be treated to the left side of the treating chamber 116 as viewed in FIG. 2, the other valve 201 will be in position to permit material to be discharged from the right hand side of the chamber 116 under the pressure exerted against the shuttle member 120 by the material being treated on the opposite side and discharge the material through pipe 22 to a suitable receiving tank 212. At the end of the selected time set on the timer 152 it will actuate the valves 200 and 201 to reverse their positions so that material incoming from pipe 18 is directed to the right hand side of the shuttle member 120 and the material on the left hand side is directed to pipe 22 and then into tank 212. In this manner material is passed into the treating chamber 116, held while being agitated for any desired length of time, and then exhausted therefrom by the movement of the shuttle member 120 under the pressure of incoming material. The movement of shuttle member 120 scrapes any residual material from the surface of the chamber 116 so as to prevent any build up of material at that point which could insulate the material being treated from the effect of the media in jacket 122 and over treat that particular part of the material which adhered to the surface.

In order to provide for rapid and vigorous agitation of the material being treated and to insure that material is repeatedly passed over the treating surfaces of the chamber 116 so as to produce uniform treatment of all of the material, pipes 204 and 205 extend from opposite ends of the treating chamber 116 to pumps 206 and 207, respectively, and exhaust pipes 208 and 209 from pumps 206 and 207, respectively, return to the respective ends of the treating chamber 116. The pumps 206 and 207 run continuously and are of a capacity which will move the material in and out of the chamber a number of times during the treating period. This means that the material being treated is constantly agitated and dispersed throughout the side of the chamber operating upon it so that all material is passed substantially uniformly over the treating surfaces and no part of the material is permitted to remain in contact with the surface longer than any other part of the material.

The receiving tank 212 is preferably in the form of a flash-off tank which will permit any undesired gases or vapors to be released from the material, and in order to implement the release of such gases and vapors a pipe 220 is connected above the liquid level in the tank and connects to an exhaust pump 222 which exhausts the vapor or gases to any desired point.

The material which has been treated can be suitably removed from tank 212 by a pipe 214 which feeds a pump 216 which discharges the treated material to any desired point by an exhaust pipe 218.

The material treating equipment shown in FIG. 3 is similar in nature to that previously described but is designed to give a higher rate of application of treating factors to the material.

In the modification of FIG. 3, a central treating element 228 consists of a treating chamber 230 provided with a suitable media jacket 236 provided with an inlet pipe 242 and an outlet pipe 248. A shuttle member 254, similar to the member 120 is disposed for sliding and scraping movement within the chamber 230. An extension 256 is suitably connected to the right hand side of the shuttle member 254 and an extension 258 is suitably connected to the left hand side of the shuttle member 254. The extension 256 is provided with a scraper member 260 and the extension 258 is provided with a scraper member 262. The scraper member 260 operates within an extension chamber 232 which communicates with chamber 230 and the scraper member 262 operates within an extension chamber 234 which communicates with the chamber 230. Extension chamber 232 is provided with a suitably removable head 233 and the extension 234 chamber is provided with a suitably removable head 235. Each of these heads is in communication with a pipe 202 and 203, respectively, which are in communication with valves and supplying structure for the material being treated exactly as shown in FIG. 1.

The extension chamber 232 is provided with a media jacket 238 having an inlet pipe 244 and an outlet pipe 250. The extension chamber 234 is provided with a media jacket 240 having an inlet pipe 246 and an outlet pipe 252. It will be understood that suitable treating media will be circulated through the three jackets just described exactly in the same manner as through the jacket 122 shown in FIG. 1.

A pipe 268 connects with the right hand end of the extension chamber 232 and feeds a pump 272 which discharges through a pipe 276 to a suitable valve 280. A pipe 284 connects with one side of the valve 280 and to the interior of the treating chamber 230. The valve 280 is connected to the receiving tank 212 by pipes 288 and 290.

A pipe 270 is connected to the extension chamber 234 and feeds a pump 274 which discharges through a pipe 278 to a valve 282. The valve 282 is connected by a pipe 286 to the interior of treating chamber 230. The valve 282 is connected to the receiving tank 212 by pipes 292 and 294. A pipe 22 receives material from the valves 200 and 201 and discharges it to the tank 212, and a pipe 214 removes material from the chamber 212 exactly as in the system shown in FIG. 1.

Openings 264 are formed in the extension 256 and openings 266 are formed in the extension 258.

Starting with the parts in the position illustrated in FIG. 3, the timer 152 has actuated valve 200 so that material to be treated will flow through pipe 202 into the chamber 234. The material will pass through the extension 258 and out through the openings 266 and thus exert pressure on the shuttle member 254 on the left hand side. This pressure will cause the shuttle member, the extensions 256 and 258 and the scraper members 260 and 262 to be moved to the right. All during the time the material is entering the chamber 234, the pump 274 is operating so as to transfer liquid from the left hand end of chamber 234 through the pipe 270 to the pump 274, through pipe 278 and through valve 282 which has also been operated by the timer 152 so that material to be treated has to pass through the pipe 286 and into the chamber 230. The pipes 294 and 292 are closed off from the valve 282 at that time so that the material to be treated is rapidly circulated through the extension chamber 234 to thereby agitate the material and pass it rapidly over the heating surfaces 234 and 230.

All during the time the shuttle member 254 is moving to the right, material to be treated is driven from the chamber 230, through the openings 264, the extension 256 and the extension chamber 232 and out of the pipe 203 because the timer 152 set the valve 201 so as to pass liquid from the pipe 203 to the pipe 22 for delivery to the receiving tank 212. At the same time that the timer 152 set valves 200 and 201 and 282 it also set valve 280 so that liquid will be removed by the pump 272 by means of a pipe 268 and carried through pipe 276 and the valve 280 to the pipe 288 which also connects with the tank 212. The valve 280 setting will also permit liquid to be removed from the treating chamber 230 and into the pipe 284, valve 280 and pipe 290 which directs the material which has been treated to the tank 212.

Whenever the shuttle member 254 reaches the end of its movement to the right so that no additional liquid will be flowing out of the pipe 284, the emptying of the pipe 284 will cause the chamber 230 to be vented from the top of tank 212 through pipe 290, valve 280 and pipe 284. This will permit the pump 272 to remove all of the material which has been treated from the chamber 232 by means of pipe 268, pump 272, pipe 276, valve 280 and pipe 288. It will be understood that the pipe 290 communicates with the receiving chamber 212 above the liquid level of chamber 212 so as to enable the venting action described above to take place. Timer 152 exactly reverses all valves.

The process of the present invention enables material to be treated by passing it through a treating chamber where it is subjected to treating forces and at the same time agitated and re-circulating the material over the treating surfaces. Also, the treating surfaces will be continuously scraped by the shuttle members moved under the pressure of the material to be treated so as to prevent adhesion of any material to the surfaces. All of this is accomplished without the aid of any externally arranged mechanical connections with the scraper member which simplifies the equipment and makes it much more dependable.

The apparatus shown in FIG. 3 enables material to be handled at a higher rate because there is increased length of treating surface for material to be passed over which is also continuously scraped at frequent intervals so as to prevent adhesion of any of the material. This equipment also permits substantially all of the material to be removed from the system at the end of each cycle and to this end the pipes 202, 203, 204, 205, 208 and 209 are made as short as possible.

It is to be understood that the present disclosure is intended to be descriptive to those skilled in the art and not limitative because changes and modifications can be made in the apparatus and process of the present invention without departing from the spirit thereof.

The invention having been disclosed, what is claimed is:

1. A process of treating material which comprises directing a starting material under pressure into a closed chamber, varying the temperature of the material in the chamber, moving a scraper member along the wall of the chamber by means of the pressure created by the material impinging thereagainst, agitating the material undergoing treatment, and discharging the treated material from the chamber.

2. A process of treating material which comprises directing starting material under pressure into a closed chamber, moving a scraper member along the wall of the chamber by means of the pressure created by the material impinging thereagainst, agitating the material undergoing treatment, and discharging the material from the chamber.

3. A cooking process which comprises directing material to be cooked under pressure into a chamber, applying heat to the material in the chamber, moving a scraper member along the wall of the chamber by means of the pressure of the material impinging upon the scraper member, agitating the material undergoing cooking, and discharging the cooked material from the chamber.

4. A process of modifying material which comprises directing the material to be modified into a closed chamber under pressure, exerting a modifying influence upon the material in the chamber, moving a scraper member along the wall of the chamber by the pressure of the material undergoing modification, agitating the material undergoing modification, and discharging the modified material from the chamber.

5. A process of cooking starch base confectionery which comprises directing the material to be cooked into a closed chamber under pressure, applying heat to the material in the chamber through the walls of the chamber, moving a scraper member along the walls of the chamber by the pressure of the material, agitating the material undergoing cooking, and discharging the cooked material from the chamber.

6. A process of treating starch base material which comprises directing the material into a closed chamber under pressure, applying heat to the material through the walls of the chamber, moving a scraper along the wall of the chamber by the pressure of the material, agitating the material undergoing treatment, and discharging the treated material from the chamber.

7. A process of cooking material comprising directing the material into a closed chamber, applying heat to the material, moving a scraper along the wall of the chamber by the pressure of the material, timing the length of time of application of the heat to the material, agitating the material undergoing cooking, and discharging the cooked material from the chamber.

8. Material treating apparatus comprising a chamber, means for directing material under pressure, valve means for controlling the entrance to and exit of material from the chamber, means for agitating the material in the chamber, means for receiving material from the chamber, and a member operated by the pressure of the material for scraping the walls of the chamber.

9. Material treating apparatus comprising a chamber, means for directing material under pressure to the chamber, means for agitating the material in the chamber, means for receiving material from the chamber, valve means for controlling the entrance to and exit of material from the chamber, a member operated by the pressure of the material for scraping the wall of the chamber and a timer for activating the valve means.

10. A cooker comprising a chamber, means for directing material to be cooked to the chamber, means for agitating the material in the chamber, means for receiving material from the chamber, valve means for controlling the entrance to and exit of the material from the chamber, a member operated by the material for scraping the walls of the chamber, and a timing means for operating the valve means.

11. Material treating apparatus comprising a chamber, a pressure creating means for directing material to be treated to the chamber, means for agitating the material in the chamber, means for receiving material from the chamber, valve means for controlling entrance to and exit of material from the chamber, timing means for operating the valve means, and means operated solely by the movement of the material being treated to scrape material from the wall of the chamber.

12. A cooker comprising a chamber, means for directing material to be cooked to the chamber, means for agitating the material in the chamber, means for receiving material from the chamber, valve means for controlling the entrance to and exit of material from the chamber, a steam jacket for applying heat to the material in the chamber, and a scraper operated by movement of the material to scrape the wall of the chamber.

13. A cooker comprising a chamber, means for directing material to the chamber under pressure, means for agitating the material in the chamber, means for receiving material from the chamber, valve means for controlling the entrance to and exit of material from the chamber, a steam jacket for heating the chamber, a member moved by the material for scraping the wall of the chamber, and electrical timing means for operating the valve means.

14. A process of treating material which comprises directing starting material under pressure into a closed chamber, moving a scraper member along the wall of the chamber by means of the pressure created by the material impinging thereagainst, forcing the material undergoing treatment into and out of the chamber to cause agitation of the material and to re-circulate the material over the surfaces of the chamber, and discharging the material from the chamber.

15. A process of treating material which comprises directing a starting material under pressure into a closed chamber, varying the temperature of the walls of the chamber, moving a scraper member along the wall of the chamber by means of the pressure created by the material impinging thereagainst, moving material undergoing treatment into and out of the chamber to cause agitation of the material and to cause it to be re-circulated over the walls of the chamber, and discharging the treated material from the chamber.

16. A process of treating material which comprises directing the starting material under pressure into a closed chamber, varying the temperature of the walls of the chamber, moving a scraper member along the wall of the chamber by means of the pressure created by the material impinging thereaganst, pumping the material undergoing treatment into and out of the chamber to agitate the material and also re-circulate it over the walls of the chamber, and discharging the treated material from the chamber.

17. A process of treating material which comprises directing a starting material under pressure into a closed chamber, varying the temperature of the material in the chamber, moving a scraper member along the wall of the chamber by means of the pressure created by the material impinging thereagainst, rapidly pumping material undergoing treatment from the chamber and directly back into the chamber to agitate the material and also re-circulate it over the walls of the chamber, and discharging the treated material from the chamber.

18. Material treating apparatus comprising a chamber, means for directing material under pressure, valve means for controlling the entrance into and exit of material from the chamber, a member operated by the pressure of the material for scraping the walls of the chamber, a pump, connections between the pump and the chamber which enable the pump to rapidly pump material undergoing treatment from the chamber and immediately return it thereto to circulate the material over the surfaces and agitate it, and means for receiving material from the chamber.

19. Material treating apparatus comprising a chamber, means for directing material under pressure into the chamber, valve means for controlling the entrance to and exit of material from the chamber, a member operated by the pressure of the material for scraping the walls of the chamber, a pump, connections between the pump and the chamber which enables the pump to rapidly pump material undergoing treatment from the chamber and back to the chamber again to agitate the material and re-circulate it over the surfaces of the chamber, and means for receiving material from the chamber.

20. A cooker comprising a chamber, means for directing material to be cooked to the chamber, valve means for controlling the entrance to and exit of the material from the chamber, a member operated by the pressure of the material for scraping the walls of the chamber, a pump, connections between the pump and the chamber which enable the pump to rapidly remove material undergoing cooking from the chamber and immediately return it thereto to agitate the material and re-circulate it over the surfaces of the chamber, and a timing means for operating the valve means.

References Cited in the file of this patent
UNITED STATES PATENTS

| | | |
|---|---|---|
| 1,731,048 | Holmes et al. | Oct. 8, 1929 |
| 2,555,018 | Von Seggern | May 29, 1951 |
| 2,726,960 | Bolanowski | Dec. 13, 1955 |
| 2,835,589 | Whitefield | May 20, 1958 |